(12) United States Patent
Ferrara (10) Patent No.: US 9,683,622 B2
(45) Date of Patent: Jun. 20, 2017

(54) AIR VENTING, IMPACT-ABSORBING COMPRESSIBLE MEMBERS

(71) Applicant: Xenith, LLC, Lowell, MA (US)

(72) Inventor: Vincent R. Ferrara, Wellesley, MA (US)

(73) Assignee: XENITH, LLC, Lowell, MA (US)

( * ) Notice: Subject to any disclaimer, the term of this patent is extended or adjusted under 35 U.S.C. 154(b) by 360 days.

(21) Appl. No.: 14/295,507

(22) Filed: Jun. 4, 2014

(65) Prior Publication Data
US 2015/0008085 A1 Jan. 8, 2015

Related U.S. Application Data

(63) Continuation of application No. 11/815,486, filed as application No. PCT/US2006/005857 on Feb. 16, (Continued)

(51) Int. Cl.
*A41D 13/01* (2006.01)
*F16F 7/12* (2006.01)
(Continued)

(52) U.S. Cl.
CPC ............ *F16F 7/12* (2013.01); *A41D 13/0155* (2013.01); *A41D 31/005* (2013.01); *A42B 3/065* (2013.01);
(Continued)

(58) Field of Classification Search
CPC .. F16F 7/12; F16F 7/128; F16F 9/0481; F16F 13/08; A41D 13/0155; A41D 31/005;
(Continued)

(56) References Cited

U.S. PATENT DOCUMENTS

| 1,080,690 A | 12/1913 | Hipkiss |
| 1,552,965 A | 9/1925 | Smith |

(Continued)

FOREIGN PATENT DOCUMENTS

| CA | 2176859 A1 | 12/1996 |
| CA | 2407462 A1 | 11/2001 |

(Continued)

OTHER PUBLICATIONS

Examination Report in Canadian Patent Application No. 2,663,728, mailed on Jan. 16, 2014, 3 pages.
(Continued)

*Primary Examiner* — Shaun R Hurley
*Assistant Examiner* — Andrew W Sutton
(74) *Attorney, Agent, or Firm* — Morgan, Lewis & Bockius LLP (57) ABSTRACT

An impact-absorbing compressible member includes a thin-walled enclosure defining an inner chamber containing a volume of fluid such as air. The enclosure includes one or more orifices which as sized and positioned to allow air to vent from the inner chamber in response to an impact on the member and to refill the inner chamber in response to an impact on the member and to refill the inner chamber after the impact is released. The enclosure is formed of a blow-molded thermoplastic elastomer (TPE) material which is economical to make and durable in use. The compressible members can be used as building blocks for impact-absorbing shell structures for a wide variety of applications such as helmets, protective pads for body parts, sports arena wall padding, vehicular bumpers, dashboards and the like. The compressible member has impact-absorbing advantages over conventional foams currently used in those applications.

16 Claims, 8 Drawing Sheets

Related U.S. Application Data 2006, now abandoned, which is a continuation-in-part of application No. 11/059,427, filed on Feb. 16, 2005, now abandoned.

(60) Provisional application No. 60/654,225, filed on Feb. 18, 2005, provisional application No. 60/654,194, filed on Feb. 18, 2005, provisional application No. 60/654,128, filed on Feb. 18, 2005.

(51) Int. Cl.
| | |
|---|---|
| *A41D 13/015* | (2006.01) |
| *A41D 31/00* | (2006.01) |
| *A42B 3/06* | (2006.01) |
| *A42B 3/12* | (2006.01) |
| *A63B 71/00* | (2006.01) |
| *A63B 71/08* | (2006.01) |
| *A63B 71/10* | (2006.01) |
| *B60R 19/20* | (2006.01) |
| *B60R 21/045* | (2006.01) |
| *F16F 9/04* | (2006.01) |
| *F16F 13/08* | (2006.01) |
| *B60R 19/18* | (2006.01) |
| *B60R 21/04* | (2006.01) |

(52) U.S. Cl.
CPC .......... *A42B 3/121* (2013.01); *A63B 71/0054* (2013.01); *A63B 71/081* (2013.01); *A63B 71/10* (2013.01); *B60R 19/20* (2013.01); *B60R 21/045* (2013.01); *F16F 7/128* (2013.01); *F16F 9/0481* (2013.01); *F16F 13/08* (2013.01); *A63B 2071/0063* (2013.01); *B60R 2019/1893* (2013.01); *B60R 2021/0407* (2013.01)

(58) Field of Classification Search
CPC ..... A42B 3/065; A42B 3/121; A63B 71/0054; A63B 71/081; A63B 71/10; A63B 2071/0063; B60R 19/20; B60R 21/045; B60R 2019/1893; B60R 2021/0407
See application file for complete search history.

(56) References Cited

U.S. PATENT DOCUMENTS

| | | | |
|---|---|---|---|
| 1,560,825 A | 11/1925 | Kelticka | |
| 2,296,355 A | 9/1942 | Levin | |
| 2,759,186 A | 8/1956 | Dye | |
| 3,039,109 A | 6/1962 | Simpson | |
| 3,144,247 A | 8/1964 | Szonn et al. | |
| 3,174,155 A | 3/1965 | Pitman | |
| 3,202,412 A | 8/1965 | Trask | |
| 3,231,454 A | 1/1966 | Williams | |
| 3,242,500 A | 3/1966 | Derr | |
| 3,447,163 A | 6/1969 | Tojeiro et al. | |
| 3,487,417 A | 12/1969 | Morgan | |
| 3,487,471 A | 1/1970 | Hagen | |
| 3,500,475 A | 3/1970 | Otsuka | |
| 3,574,379 A | 4/1971 | Jordan | |
| 3,600,714 A | 8/1971 | Cade et al. | |
| 3,609,764 A | 10/1971 | Morgan | |
| 3,666,220 A | 5/1972 | Rider | |
| 3,666,310 A | 5/1972 | Charno et al. | |
| 3,668,704 A | 6/1972 | Conroy et al. | |
| 3,713,640 A | 1/1973 | Margan | |
| 3,747,968 A | 7/1973 | Hornsby | |
| 3,782,511 A | 1/1974 | Parfitt | |
| 3,784,985 A | 1/1974 | Conroy | |
| 3,787,893 A * | 1/1974 | Larcher | A42B 3/062 2/413 |
| 3,811,467 A | 5/1974 | Jones | |
| 3,849,801 A | 11/1974 | Holt et al. | |
| 3,872,511 A | 3/1975 | Nichols | |
| 3,877,076 A | 4/1975 | Summers et al. | |
| 3,880,087 A * | 4/1975 | Pamer | B61B 13/04 104/123 |
| 3,900,222 A | 8/1975 | Muller | |
| 3,971,583 A | 7/1976 | Kornhauser | |
| 3,984,595 A | 10/1976 | Stephens | |
| 3,999,220 A | 12/1976 | Keltner | |
| 4,023,213 A | 5/1977 | Rovani | |
| 4,037,273 A | 7/1977 | Labaire | |
| 4,038,700 A | 8/1977 | Gyory | |
| 4,064,565 A | 12/1977 | Griffiths | |
| 4,067,063 A | 1/1978 | Ettinger | |
| 4,075,717 A | 2/1978 | Lemelson | |
| 4,076,872 A * | 2/1978 | Lewicki | B60R 19/20 138/93 |
| 4,098,434 A | 7/1978 | Uhlig | |
| 4,099,759 A | 7/1978 | Kornhauser | |
| 4,105,236 A | 8/1978 | Haar | |
| 4,124,904 A | 11/1978 | Matthes | |
| 4,134,156 A | 1/1979 | Gyory | |
| 4,191,370 A | 3/1980 | Imatt et al. | |
| 4,192,699 A | 3/1980 | Lewicki et al. | |
| 4,213,202 A | 7/1980 | Larry | |
| 4,218,807 A | 8/1980 | Snow | |
| 4,282,610 A | 8/1981 | Steigerwald et al. | |
| 4,370,754 A | 2/1983 | Donzis | |
| 4,432,099 A | 2/1984 | Grick et al. | |
| 4,441,751 A | 4/1984 | Wesley | |
| 4,453,271 A | 6/1984 | Donzis | |
| 4,472,472 A | 9/1984 | Schultz | |
| 4,534,068 A | 8/1985 | Mitchell et al. | |
| 4,564,959 A | 1/1986 | Zahn | |
| 4,566,137 A | 1/1986 | Gooding | |
| 4,568,102 A | 2/1986 | Dauvergne | |
| 4,586,200 A | 5/1986 | Poon | |
| 4,627,114 A | 12/1986 | Mitchell | |
| 4,642,814 A | 2/1987 | Godfrey | |
| 4,700,411 A | 10/1987 | Kawasaki et al. | |
| 4,704,746 A | 11/1987 | Nava | |
| 4,710,984 A | 12/1987 | Asper et al. | |
| 4,724,549 A | 2/1988 | Herder et al. | |
| 4,883,299 A | 11/1989 | Bonar | |
| 4,911,443 A | 3/1990 | Foster | |
| 4,916,759 A | 4/1990 | Arai | |
| 4,937,888 A | 7/1990 | Straus | |
| 4,970,729 A | 11/1990 | Shimazaki | |
| 5,042,859 A | 8/1991 | Zhang et al. | |
| 5,056,162 A | 10/1991 | Tirums | |
| 5,058,212 A | 10/1991 | Kamata | |
| 5,083,320 A | 1/1992 | Halstead | |
| 5,093,938 A | 3/1992 | Kamata | |
| 5,098,124 A | 3/1992 | Breed et al. | |
| 5,161,261 A | 11/1992 | Kamata | |
| 5,204,998 A | 4/1993 | Liu | |
| 5,235,715 A | 8/1993 | Donzis | |
| 5,263,203 A | 11/1993 | Kraemer et al. | |
| 5,319,808 A | 6/1994 | Bishop et al. | |
| 5,334,646 A | 8/1994 | Chen | |
| 5,336,708 A | 8/1994 | Chen | |
| 5,343,569 A | 9/1994 | Asare et al. | |
| 5,345,614 A | 9/1994 | Tanaka | |
| 5,356,177 A * | 10/1994 | Weller | B60R 21/0428 280/751 |
| 5,388,277 A | 2/1995 | Taniuchi | |
| 5,412,810 A | 5/1995 | Taniuchi | |
| 5,500,951 A | 3/1996 | Marchello | |
| 5,548,848 A | 8/1996 | Huybrechts | |
| 5,561,866 A | 10/1996 | Ross | |
| 5,575,017 A | 11/1996 | Hefling et al. | |
| 5,678,885 A | 10/1997 | Stirling | |
| 5,713,082 A | 2/1998 | Bassette et al. | |
| 5,734,994 A | 4/1998 | Rogers | |
| 5,764,271 A | 6/1998 | Donohue | |
| 5,794,271 A | 8/1998 | Hastings | |
| 5,846,063 A | 12/1998 | Lakic | |
| 5,867,840 A | 2/1999 | Hirosawa et al. | |
| 5,872,511 A | 2/1999 | Ohkuma | |

(56) References Cited

U.S. PATENT DOCUMENTS

| | | |
|---|---|---|
| 5,881,395 A | 3/1999 | Donzis |
| 5,911,310 A | 6/1999 | Bridgers |
| 5,916,664 A | 6/1999 | Rudy |
| 5,943,706 A | 8/1999 | Miyajima et al. |
| 5,950,243 A | 9/1999 | Winters et al. |
| 5,956,777 A | 9/1999 | Popovich |
| 6,026,527 A | 2/2000 | Pearce |
| 6,058,515 A | 5/2000 | Kitahara |
| 6,065,158 A | 5/2000 | Rush |
| 6,073,271 A | 6/2000 | Alexander et al. |
| 6,098,209 A | 8/2000 | Bainbridge et al. |
| 6,260,212 B1 | 7/2001 | Orotelli et al. |
| 6,332,226 B1 | 12/2001 | Rush, III |
| 6,349,599 B1 | 2/2002 | Lynnworth et al. |
| 6,351,853 B1 | 3/2002 | Halstead et al. |
| 6,394,432 B1 | 5/2002 | Whiteford |
| 6,401,262 B2 | 6/2002 | Bacchiega |
| 6,425,141 B1 | 7/2002 | Ewing et al. |
| 6,434,755 B1 | 8/2002 | Halstead et al. |
| 6,446,270 B1 | 9/2002 | Durr |
| 6,453,476 B1 | 9/2002 | Moore, III |
| 6,467,099 B2 | 10/2002 | Dennis et al. |
| 6,519,873 B1 | 2/2003 | Buttigieg |
| 6,560,787 B2 | 5/2003 | Mendoza |
| 6,565,461 B1 | 5/2003 | Zatlin |
| 6,604,246 B1 | 8/2003 | Obreja |
| 6,658,671 B1 | 12/2003 | Von Holst et al. |
| 6,665,884 B1 | 12/2003 | Demps et al. |
| 6,681,408 B2 | 1/2004 | Ku |
| 6,694,529 B1 | 2/2004 | Chiu |
| 6,704,943 B2 | 3/2004 | Calonge Clavell |
| 6,803,005 B2 | 10/2004 | Dennis et al. |
| 6,839,910 B2 | 1/2005 | Morrow et al. |
| 6,908,209 B2 | 6/2005 | Miller |
| 6,925,657 B2 | 8/2005 | Takahashi et al. |
| 6,934,971 B2 | 8/2005 | Ide et al. |
| 7,146,652 B2 | 12/2006 | Ide et al. |
| 7,188,375 B2 | 3/2007 | Harrington |
| 7,444,687 B2 | 11/2008 | Sato et al. |
| 7,578,074 B2 | 8/2009 | Ridinger |
| 7,774,866 B2 | 8/2010 | Ferrara |
| 7,895,681 B2 | 3/2011 | Ferrara |
| 8,528,119 B2 | 9/2013 | Ferrara et al. |
| 2002/0023291 A1 | 2/2002 | Mendoza |
| 2003/0221245 A1 | 12/2003 | Lee et al. |
| 2004/0025231 A1* | 2/2004 | Ide .................... A42B 3/08 2/425 |
| 2004/0117896 A1 | 6/2004 | Madey et al. |
| 2004/0168246 A1 | 9/2004 | Phillips |
| 2004/0261157 A1 | 12/2004 | Talluri |
| 2007/0075469 A1 | 4/2007 | Yamazaki |
| 2007/0190292 A1 | 8/2007 | Ferrara |
| 2007/0190293 A1 | 8/2007 | Ferrara |
| 2007/0198292 A1 | 8/2007 | Ash et al. |
| 2008/0155735 A1 | 7/2008 | Ferrara |
| 2008/0256686 A1 | 10/2008 | Ferrara |
| 2010/0025902 A1 | 2/2010 | Hofmann et al. |
| 2010/0186150 A1 | 7/2010 | Ferrara et al. |
| 2010/0186158 A1 | 7/2010 | Morita et al. |
| 2010/0282554 A1 | 11/2010 | Stone |
| 2011/0047685 A1 | 3/2011 | Ferrara et al. |
| 2012/0266366 A1 | 10/2012 | Ferrara |
| 2013/0152284 A1 | 6/2013 | Ferrara et al. |
| 2013/0153350 A1 | 6/2013 | Ferrara et al. |
| 2014/0097052 A1 | 4/2014 | Reynolds et al. |
| 2015/0223545 A1* | 8/2015 | Fraser .................... A42B 3/121 2/413 |

FOREIGN PATENT DOCUMENTS

| | | |
|---|---|---|
| DE | 3619282 A1 | 12/1987 |
| DE | 4336665 A1 | 5/1995 |
| FR | 1572542 A | 6/1969 |
| FR | 2561887 A1 | 10/1985 |
| GB | 1316722 A | 5/1973 |
| GB | 1503483 A | 3/1978 |
| GB | 2287435 A | 9/1995 |
| JP | 3-282031 A | 12/1991 |
| JP | 4-4332 A | 1/1992 |
| WO | 92/04210 A1 | 3/1992 |
| WO | 96/14768 A1 | 5/1996 |
| WO | 2006/005143 A1 | 1/2006 |
| WO | 2006/089098 A1 | 8/2006 |
| WO | 2006/089234 A2 | 8/2006 |
| WO | 2006/089235 A1 | 8/2006 |
| WO | 2012/045169 A1 | 4/2012 |

OTHER PUBLICATIONS

Examination Report in Canadian Patent Application No. 2,681,439, mailed on Feb. 7, 2014, 3 pages.
Examination Report in Canadian Patent Application No. 2,820,137, mailed on Sep. 30, 2013, 3 pages.
Extended Search Report issued for European Patent Application No. 11250730.6, mailed on Dec. 9, 2013, 6 pages.
International Application Serial No. PCT/US2007/021050, International Search Report and Written Opinion mailed on Aug. 22, 2008, 10 pages.
International Application Serial No. PCT/US2010/000211, International Search Report and Written Opinion mailed on May 17, 2010, 10 pages.
Barth et al., "Acceleration-Deceleration Sport-Related Concussion: The Gravity of It All", Journal of Athletic Training, vol. 36, No. 3, Sep. 2001, pp. 253-256.
U.S. Appl. No. 12/360,864, filed Jan. 28, 2009 by Vincent R. Ferrara et al.
U.S. Appl. No. 12/857,753, filed Aug. 17, 2010 by Vincent R. Ferrara et al.
U.S. Appl. No. 11/816,145, filed Aug. 13, 2007 by Vincent R. Ferrara et al.
U.S. Appl. No. 13/325,716, filed Dec. 14, 2011 by Vincent R. Ferrara et al.
U.S. Appl. No. 14/046,482, filed Oct. 4, 2013 by Alexander Reynolds et al.
U.S. Appl. No. 13/325,728, filed Dec. 14, 2011 by Vincent R. Ferrara et al.
U.S. Appl. No. 11/815,486, filed Aug. 3, 2007 by Vincent R. Ferrara et al.
U.S. Appl. No. 11/543,642, filed Oct. 5, 2006 by Ferrara et al.; Non-Final Office Action mailed Oct. 1, 2009 and Notice of Allowance mailed Apr. 15, 2010.
U.S. Appl. No. 11/689,541, filed Mar. 22, 2007 by Ferrara et al.; Restriction Requirement mailed Apr. 1, 2010; Non-Final Office Action mailed Jul. 8, 2010 and Notice of Allowance mailed Dec. 10, 2010.
U.S. Appl. No. 11/815,486, filed Aug. 3, 2007 by Ferrara et al.; Non-Final Office Action mailed Aug. 5, 2011; Non-Final Office Action mailed Mar. 25, 2013; Final Office Action mailed May 10, 2012 and Final Office Action mailed Feb. 4, 2014.
U.S. Appl. No. 11/816,145, filed Aug. 13, 2007 by Ferrara et al.; Restriction Requirement mailed Sep. 16, 2011; Non-Final Office Action mailed Jan. 24, 2012 and Final Office Action mailed Oct. 16, 2012.
U.S. Appl. No. 12/360,864, filed Jan. 28, 2009 by Ferrara et al.; Non-Final Office Action mailed Aug. 5, 2011.
U.S. Appl. No. 12/857,753, filed Aug. 17, 2010 by Ferrara et al.; Non-Final Office Action mailed Mar. 29, 2012.
U.S. Appl. No. 13/325,716, filed Dec. 14, 2011 by Ferrara et al.; Restriction Requirement mailed on Nov. 20, 2013 and Non-Final Office Action mailed Jan. 17, 2014.
U.S. Appl. No. 13/325,728, filed Dec. 14, 2011 by Ferrara et al.; Non-Final Office Action mailed Aug. 1, 2013; Final Office Action mailed on Feb. 13, 2014 and Notice of Allowance Received mailed Apr. 18, 2014.
U.S. Appl. No. 13/534,160, filed Jun. 27, 2012 by Ferrara et al.; Non-Final Office Action mailed Jan. 14, 2013 and Notice of Allowance mailed on Jun. 28, 2013.

* cited by examiner

AIR VENTING, IMPACT-ABSORBING COMPRESSIBLE MEMBERS

CROSS-REFERENCE TO RELATED APPLICATIONS

This application is a continuation of, and claims priority to, co-pending U.S. patent application Ser. No. 11/815,486, filed Aug. 3, 2007 which is a continuation-in-part application claiming priority to my co-pending U.S. patent application Ser. No. 11/059,427, filed Feb. 16, 2005, titled "Multi-Layer Air-Cushion Shell With Energy-Absorbing Layer For Use in the Construction of Protective Headgear." The entirety of this patent application is incorporated by reference herein.

This application also claims priority to my Provisional Application No. to 60/654,225, filed Feb. 18, 2005, titled "Compressible Air Cushion Technology For Use In Protective Body Equipment," my Provisional Application No. 60/654,194, filed Feb. 18, 2005, titled "Compressible Air Cushion Technology For Use In Sports Arenas," and my Provisional Application No. 60/654,128, filed Feb. 18, 2005, titled "Vehicular Uses Of Compressible Air Cushion Technology." The entireties of these provisional applications are also incorporated by reference herein.

This application is also related to my PCT application filed concurrently herewith, titled "Energy-Absorbing Liners For Use With Protective Headgear" PCT/US06/05856. The entirety of this application is also incorporated by reference herein.

BACKGROUND OF THE INVENTION

1. Field of the Invention

The invention relates generally to thin-walled, impact-absorbing compressible members. More specifically, the invention relates to an air venting, impact-absorbing compressible member, preferably fabricated from thermoplastic elastomer (TPE) material, that can be used in the construction of a wide variety of shock-absorbing and/or impact protective devices, including, without limitation, protective headgear, protective pads for other parts of the body, protective padding for sports arenas such as hockey rink boards and the like, and impact-absorbing devices for vehicles such as bumpers, dashboards and the like.

2. Background Information

Concussions, also called mild traumatic brain injury, are a common, serious problem in sports known to have detrimental effects on people in the short and long term. With respect to athletes, a concussion is a temporary and reversible neurological impairment, with or without loss of consciousness. Another definition of a concussion is a traumatically induced alteration of brain function manifested by 1) an alteration of awareness or consciousness, and 2) signs and symptoms commonly associated with post-concussion syndrome, such as persistent headaches, loss of balance, and memory disturbances, to list but a few. Some athletes have had their careers abbreviated because of concussions, in particular because those who have sustained multiple concussions show a greater proclivity to further concussions and increasingly severe symptoms. Although concussions are prevalent among athletes, the study of concussions is difficult, treatment options are virtually non-existent, and "return-to-play" guidelines are speculative. Accordingly, the best current solution to concussions is prevention and minimization.

Concussion results from a force being applied to the brain, usually the result of a direct blow to the head, which results in shearing force to the brain tissue, and a subsequent deleterious neurometabolic and neurophysiologic cascade. There are two primary types of forces experienced by the brain in an impact to the head, linear acceleration and rotational acceleration. Both types of acceleration are believed to be important in causing concussions. Decreasing the magnitude of acceleration thus decreases the force applied to the brain, and consequently reduces the risk or severity of a concussion.

Protective headgear is well known to help protect wearers from head injury by decreasing the magnitude of acceleration (or deceleration) experienced by the wearers. Currently marketed helmets primarily address linear forces, but generally do not diminish the rotational forces experienced by the brain. Helmets fall generally into two categories: single impact helmets and multiple-impact helmets. Single-impact helmets undergo permanent deformation under impact, whereas multiple-impact helmets are capable of sustaining multiple blows. Applications of single-impact helmets include, for example, bicycling and motorcycling. Participants of contact sports, such as hockey and football, use multiple-impact helmets. Both categories of helmets have similar construction. A semi-rigid outer shell distributes the force of impact over a wide area and a compressible foam inner layer reduces the force upon the wearer's head.

The inner layer of single-impact helmets are typically constructed of fused expanded polystyrene (EPS), a polymer impregnated with a foaming agent. EPS reduces the amount of energy that reaches the head by permanently deforming under the force of impact. To be effective against the impact, the inner layer must be sufficiently thick not to crush entirely throughout its thickness. A thick inner layer, however, requires a corresponding increase in the size of the outer shell, which increases the size and bulkiness of the helmet.

Inner layers designed for multiple-impact helmets absorb energy through elastic and viscoelastic deformation. To absorb multiple successive hits, these helmets is need to rebound quickly to return to their original shape. Materials that rebound too quickly, however, permit some of the kinetic energy of the impact to transfer to the wearer's head. Examples of materials with positive rebound properties, also called elastic memory, include foamed polyurethane, expanded polypropylene, expanded polyethylene, and foamed vinylnitrile. Although some of these materials have desirable rebound qualities, an inner layer constructed therefrom must be sufficiently thick to prevent forceful impacts from penetrating its entire thickness. The drawback of a thick foam layer, as noted above, is the resulting bulkiness of the helmet. Moreover, the energy absorbing properties of such materials tend to diminish with increasing temperatures, whereas the positive rebound properties diminish with decreasing temperatures.

Regardless of the particular material involved, the material properties and densities of foam inner layers in helmets have historically been selected to optimally absorb energy for impacts that are considered severe for the particular sport or activity in which the helmets are to be used. Foams are thus relatively ineffective in absorbing impact energies below the severe level. Industry safety standards currently test and certify helmet designs based on their ability to absorb high energy impacts to ensure that helmets protect wearers against severe head injuries, such as skull fractures. Recent evidence has shown that lower energy impacts result in less severe yet still damaging head injuries, typically concussions. Current laboratory certification tests are pass/fail tests, and are not designed to test for prevention of concussions.

As such, testing of helmets to protect against concussions is being developed outside the realm of existing industry standards as the industry attempts to determine if helmets can be designed that provide universal protection against both mild and severe impacts. Several manufacturers are experimenting with various permutations of laminated foams and newer materials to broaden the range of impact energies over which the materials provide effective energy absorption. While some progress is being made, it is limited. This is due at least in part to the fact that foam materials are inherently limited in their ability to absorb energy because of their tendency to "bottom out" when compressed. Specifically, foams can be compressed downwardly only about seventy percent (70%) from their uncompressed thicknesses before they become so dense and stiff that they no longer effectively absorb impact energy. This factor is referred to as the "ride-down" point of the foam. When compressed to the is maximum "ride-down" point, a foam in a helmet is said to have "bottomed out", and acts essentially as a rigid layer that transfers impact energy with little or no absorption directly to the wearer's head.

There is thus a need in the industry for an improved helmet construction that can reduce the risk and severity of head injuries, including concussions, over a wide range of impact energies, without the aforementioned disadvantages of current helmet designs. There exists a similar need for structures that have improved impact-absorbing properties for use in a variety of other applications.

SUMMARY OF THE INVENTION

The present invention provides a compressible member whose properties, configuration and construction are optimized to maximize its impact-absorbing capabilities over a wide range of impact energies.

In accordance with the invention, a compressible member comprises a thin-walled enclosure defining a hollow inner chamber containing a volume of fluid such as air. The compressible member has at least one orifice by which fluid can vent from its inner chamber when the member experiences an impact. Preferably, the orifice is sized and positioned so that the compressible member provides a rate sensitive response to impacts, i.e., the member provides relatively low resistance to compression in response to relatively low energy impacts and relatively high resistance to compression in response to relatively high energy impacts. More than one orifice may also be provided in the compressible member so that air flows into its inner chamber following an impact at a rate that can be selected by the designer depending on the particular application of the member to be equal to, less than, or greater than the rate at which air flows out of the inner chamber during the impact.

The thin-walled enclosure of the compressible member is preferably fabricated from blow-molded thermoplastic elastomer material ("TPE"). TPE materials are uniquely suited for the fabrication of the impact-absorbing, compressible members of the invention because they can be readily and economically molded and shaped into the desired thin-walled, hollow configuration, and because they maintain their compressibility, stretchability and structural integrity in use after experiencing repeated impacts. Additionally, because they are hollow and air filled, the TPE compressible members of the invention are capable of being compressed to substantially greater degrees than conventional foams of the type currently used in protective headgear, without "bottoming out." This greater degree of "ride down" makes the TPE compressible members of the invention effective in the absorption of a much wider range of impact energies. Other advantages resulting from the use of TPE materials for the compressible members of the invention, and their higher "ride-down" factors, are discussed in more detail below.

The compressible members of the invention may be assembled side-by-side in a layer, and combined with one or more layers of other materials, to form multilayer impact-absorbing shells for use in a wide variety of applications. One particularly advantageous embodiment of a protective shell structure comprises a thin outer shell layer, a compressible middle layer comprised of a plurality of the compressible members of the invention arranged in spaced apart positions, and a thin inner layer. In response to an impact to the outer shell layer, the outer layer deflects locally causing the compressible members of the middle layer to compress and vent air from their inner chambers. The inner layer is preferably provided with one or more passageways that allow the air vented from the compressible members to pass to the inside of the inner layer. The outer shell layer and the inner layer are also preferably secured to the compressible middle layer, but not directly or rigidly to each other. This allows the outer layer to shear or rotate relative to the inner layer and thus take up and absorb tangential components of the impact force.

Multilayered shell structures which include one or more compressible members of the invention can be configured and used in the construction of a wide variety of impact-absorbing devices. Examples disclosed include helmets, protective body pads, sports arena padding, vehicle bumpers, dashboards and the like.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale or relative dimension, emphasis instead being placed upon illustrating the principles of the invention.

FIGS. 1B and 1I-1K are diagrams of a sequence illustrating simulated effects of a high-energy impact to the compressible member of FIG. 1A.

DETAILED DESCRIPTION OF AN ILLUSTRATIVE EMBODIMENT

Figure 1A:
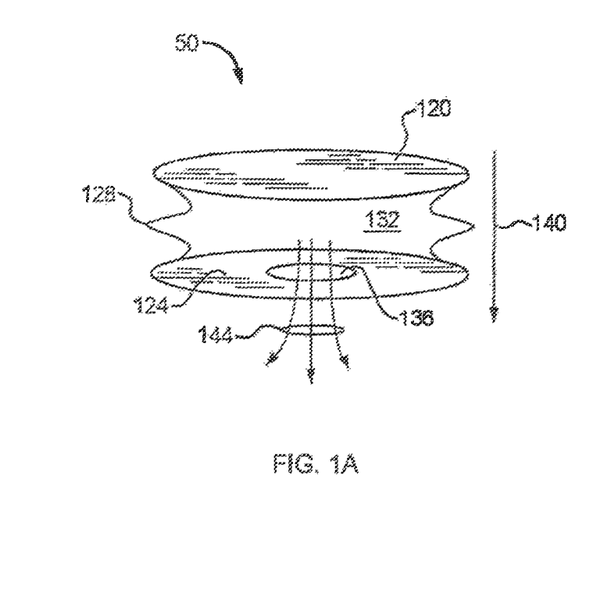
FIGS. 1A and 1I-1K are diagrams illustrating an embodiment of a compressible member of the invention having an enclosure with a bellows-like wall construction and defining a hollow inner chamber for holding a volume of fluid (e.g., air).
Figure 1B:
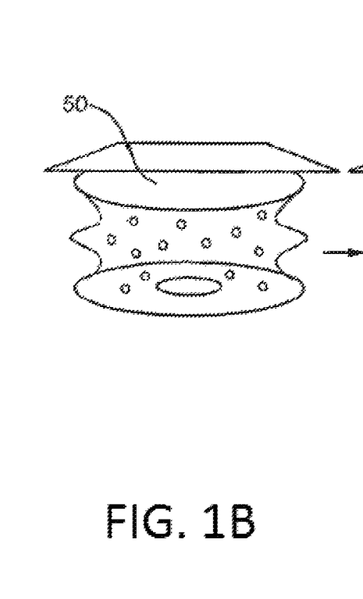

FIG. 1A illustrates a compressible member 50 embodied in accordance with the present invention. The member 50 has a top surface 120, a bottom surface 124, and a sidewall 128 that together define a hollow inner chamber 132. The bottom surface 124 has a small orifice 136 formed therein. When the member 50 compresses in the general direction indicated by arrow 140, airflow 144, for example, exits the small orifice 136. The member 50 is formed of TPE material which, as discussed in more detail below, because of its unique properties, optimizes the impact-absorbing properties of the compressible member 50.

Thermoplastic elastomers or TPEs are polymer blends or compounds, which exhibit thermoplastic characteristics that enable shaping into a fabricated article when heated above their melting temperature, and which possess elastomeric properties when cooled to their designed temperature range. Accordingly, TPEs combine the beneficial properties of plastic and rubber, that is, TPEs are moldable and shapeable into a desired shape when heated and are compressible and stretchable when cooled. In contrast, neither thermoplastics nor conventional rubber alone exhibits this combination of properties.

To achieve satisfactory purposes, conventional rubbers must be chemically crosslinked, a process often referred to as vulcanization. This process is slow, irreversible, and results in the individual polymer chain being linked together by covalent bonds that remain effective at normal processing temperatures. As a result, vulcanized rubbers do not become fluid when heated to these normal processing temperatures (i.e., the rubber cannot be melted). When heated well above normal processing temperatures, vulcanized rubbers eventually decompose, resulting in the loss of substantially all useful properties. Thus, conventional vulcanized rubbers cannot be formed into useful objects by processes that involve the shaping of a molten material. Such processes include injection molding, blow molding and extrusion, and are extensively used to produce useful articles from thermoplastics.

Thermoplastics are generally not elastic when cooled and conventional rubbers are not moldable using manufacturing processes and equipment currently used for working with thermoplastics, such as injection molding and extrusion. These processes, however, are applicable for working with TPEs.

Most TPEs have a common feature: they are phase-separated systems. At least one phase is hard and solid at room temperature and another phase is elastomeric and fluid. Often the phases are chemically bonded by block or graft polymerization. In other cases, a fine dispersion of the phases is apparently sufficient. The hard phase gives the TPEs their strength. Without the hard phase, the elastomer phase would be free to flow under stress, and the polymers would be unusable. When the hard phase is melted, or dissolved in a solvent, flow can occur and therefore the TPE can be processed. On cooling, or upon evaporation of the solvent, the hard phase solidifies and the TPEs regain their strength. Thus, in one sense, the hard phase of a TPE behaves similarly to the chemical crosslinks in conventional vulcanized rubbers, and the process by which the hard phase does so is often called physical crosslinking. At the same time, the elastomer phase gives elasticity and flexibility to the TPE.

Examples of TPEs include block copolymers containing elastomeric blocks chemically linked to hard thermoplastic blocks, and blends of these block copolymers with other materials. Suitable hard thermoplastic blocks include polystyrene blocks, polyurethane blocks, and polyester blocks. Other examples of TPEs include blends of a hard thermoplastic with a vulcanized elastomer, in which the vulcanized elastomer is present as a dispersion of small particles. These latter blends are known as thermoplastic vulcanizates or dynamic vulcanizates.

TPEs can also be manufactured with a variety of hardness values, e.g., a soft gel or a hard 90 Shore A or greater. One characteristic of the TPE material is its ability to return to its original shape after the force against it removed (i.e., TPE material is said to have memory). Other characteristics of TPE include its resistance to tear, its receptiveness to coloring, and its rebound resilience elasticity. Rebound resilience elasticity is the ratio of regained energy in relation to the applied energy, and is expressed as a percentage ranging from 0% to 100%. A perfect energy absorber has a percentage of 0%; a perfectly elastic material has a percentage of 100%. In general, a material with low rebound resilience elasticity absorbs most of the applied energy from an impacting object and retransmits little or none of that energy. To illustrate, a steel ball that falls upon material with low rebound resilience elasticity experiences little or no bounce; the material absorbs the energy of the falling ball. In contrast, the ball bounces substantially if it falls upon material with high rebound resilience elasticity. This characteristic can influence the behavior of the compressible member.

Another advantage of these TPEs is that their favorable characteristics may exist over a wide range of temperatures. Preferably, the TPE material of the compressible member 50 has a glass-transition temperature of less than −20 degrees Fahrenheit. The glass-transition temperature is the temperature below which the material loses its soft and rubbery qualities. A TPE material with an appropriate glass-transition temperature can be selected for the compressible member 50 depending on the particular application of the member (e.g., a glass-transition temperature of 0 degrees Fahrenheit may be sufficient for baseball helmets, whereas a glass transition temperature of −40 degrees Fahrenheit may be needed for football and hockey helmets).

The size of the opening 136 in the compressible member 50 is preferably selected to produce a rate-sensitive response to any impact causing compression of the member 50. For instance, if the application of force upon the member 50 is gradual or of relatively low energy, the opening 136 permits sufficient air to pass through so that the member 50 compresses gradually and presents little resistance against the force. In that case, an individual may be able to compress the member 50 manually with a moderate touch of a hand or finger.

If, as illustrated by FIGS. 1B and 1I-1K, the application of force upon the member 50 occurs instantaneously or is of relatively high energy, laminar or turbulent air flows within the inner chamber 132. The size of the opening 136, which is small relative to the volume of air moved by the force, restricts the emission of the turbulent or laminar air from the chamber 132 and thus causes resistance within the chamber 132. Eventually the resistance is overcome and air flows out, and during this process, a portion of the impact energy is also converted to heat. This variable response, dependent upon the energy input, is termed a rate-sensitive or a non-linear response.

A further important advantage of the compressible member 50 is that it can be compressed ninety percent (90%) or more from its uncompressed thickness before "bottoming out", i.e., before the top wall of TPE material comes in contact with the bottom wall of TPE material. This increased "ride-down" factor compared to conventional foams, which have ride-down factors of only about 70%, increases the distance over which impacts are effectively absorbed and, as a result, decreases the force transferred through the compressible member 50 proportionately to this increased distance. Even when the compressible member 50 "bottoms out", a thickness of TPE material (equal to twice the wall thickness) remains, which, because of its compressibility, provides further energy absorption.

Additionally, the geometry of the compressible member 50, the stiffness and elasticity of the TPE material used for its enclosure, and the venting of the member 50 can all be adjusted and optimized to provide a "softer landing" than conventional foams across a broad range of impact energy levels. Force/time curves for foams are bell-shaped due to the increased stiffness of foams as they are compressed which results in increasing forces with severe peaks. The shape of the force/time curve for foams is similar regardless of the amount of ride-down, which is dependent on the energy of the impact. For low energy impacts, the ride-down distance of foams is low and can result in concussions, even at relatively low impact energies, especially with EPS foams.

The compressible member 50 of the invention, on the other hand, can be engineered to allow optimal ride down for a wide range of impact energies and also to "shape" the rate at which the forces increase during the impact. This "shaping" of the force/time curve is accomplished by managing the air pressure in the inner chamber of the member 50 for various impact energies, something foams cannot do. The result is a flatter and broader force/time curve for the compressible member 50 which reduces the force of impact. This broader, flatter curve in essence demonstrates a "soft landing".

This technology allows for the manipulation of multiple engineering parameters, such as material properties, chamber geometry, chamber wall thickness, and relative configurations of outflow(s) and inflow(s). Careful calibration of the many design parameters will allow those skilled in the art to determine the optimum combination based on the particular application to which the member 50 is to be put.

Figure 1C:
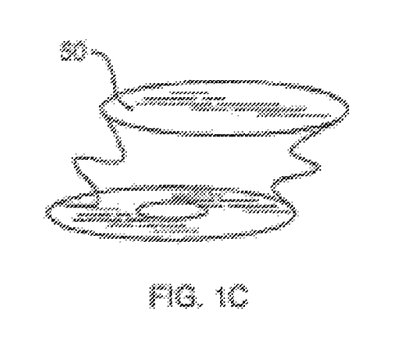
FIGS. 1C and 1D are diagrams illustrating the stretching and bending (e.g., shearing) capabilities of the compressible member of FIG. 1A.
Figure 1D:
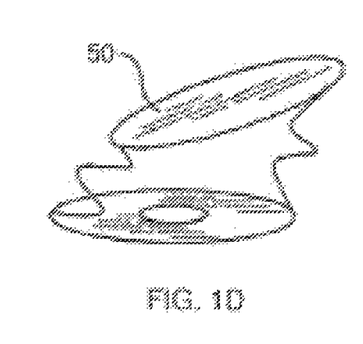

In addition to providing this rate-sensitive response, the compressible member 50 can also stretch and bend during tangential impact, as illustrated by FIG. 1C and FIG. 1D. This allows the compressible member 50 to shear in response to the tangential impacts and absorb rotational forces as well as direct forces applied normal to the top surface 120 of the member 50.

Figure 1E:
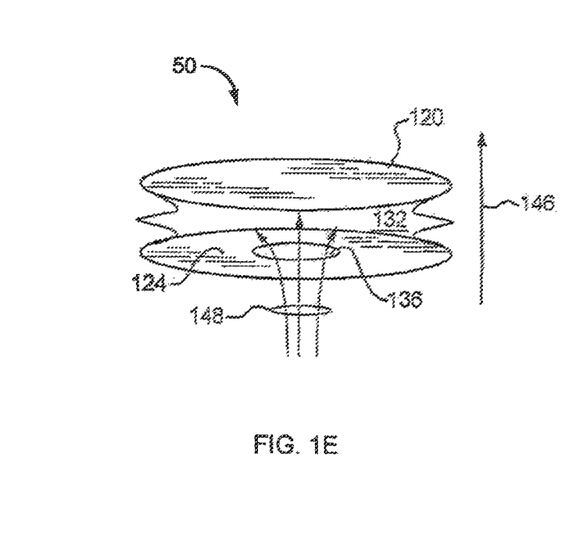
FIG. 1E is a diagram of the compressible member of FIG. 1A following an impact.
Figure 1F:
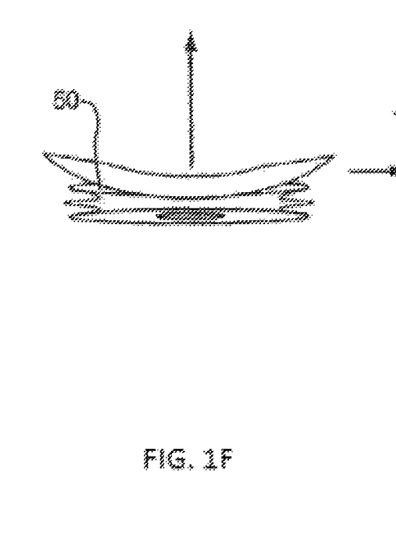
FIGS. 1F-1H are diagrams illustrating the expansion of the compressible member of FIG. 1A to its uncompressed condition after impact force is removed.
Figure 1G:
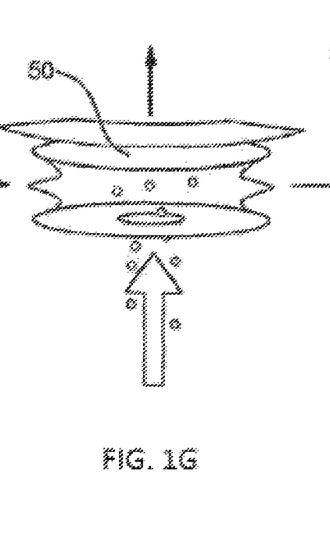
Figure 1H:
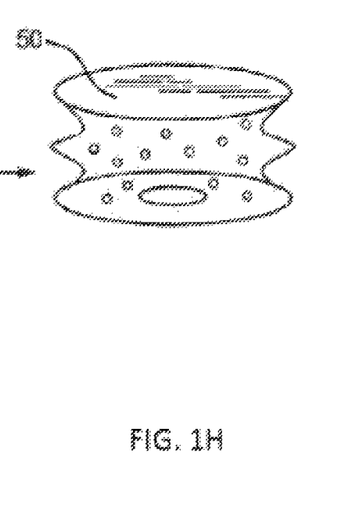
Figures 1I, 1J:
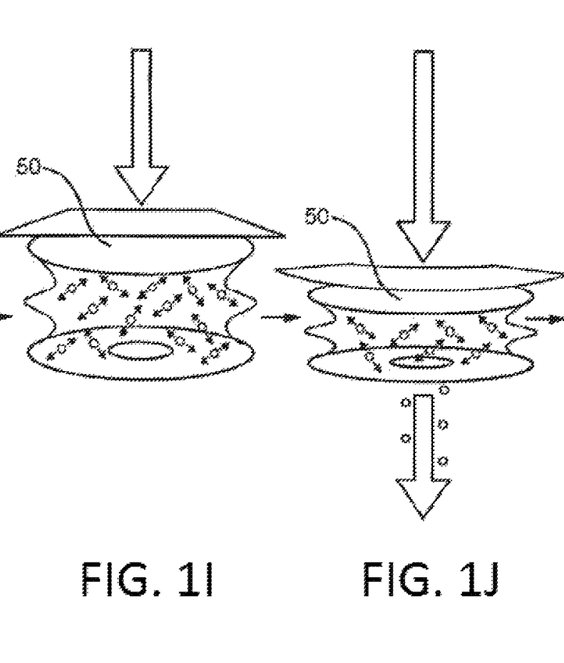
Figure 1K:
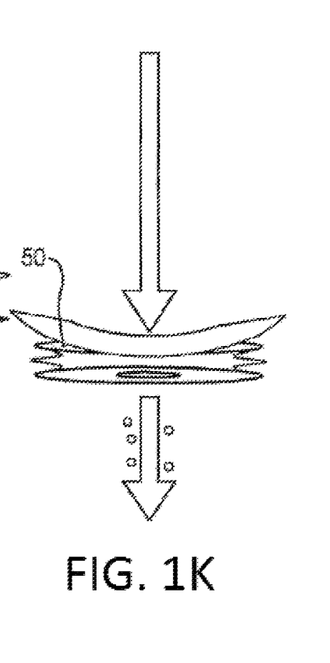

FIG. 1E shows the compressible member 50 following an impact. Because of its resilient nature, the tendency of the member 50 is to return to its uncompressed shape. Accordingly, after the impact force is removed from the compressible member 50, it expands in the direction indicated by arrow 146, consequently drawing air in through the opening 136 as indicated by arrows 148. FIGS. 1F-1H illustrate a simulated sequence of expansion of a rate-sensitive compressible member 50, as the impact force is removed.

Figure 2:
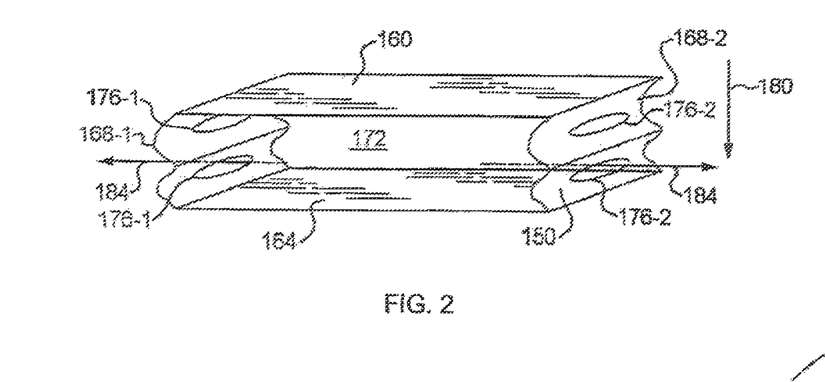
FIG. 2 is a diagram of another embodiment of a compressible member of the invention having a generally rectangular shape and configuration.
Figure 3A:
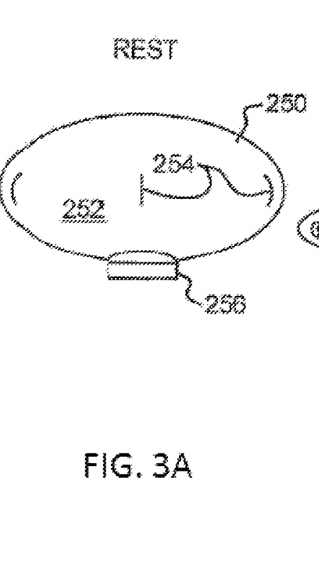
FIGS. 3A-3D are diagrams of a sequence illustrating simulated effects of an impact on another embodiment of a compressible member of the invention having separate inflow and outflow orifices for the fluid contained in its inner chamber.
Figure 3B:
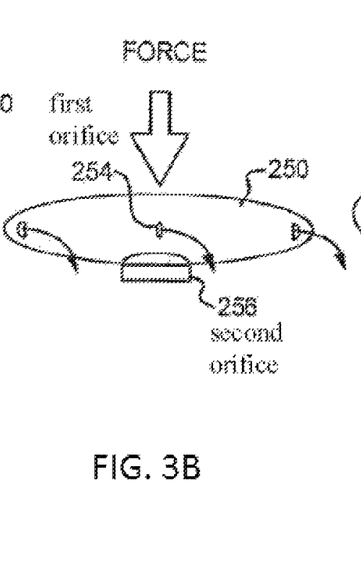
Figure 3C:
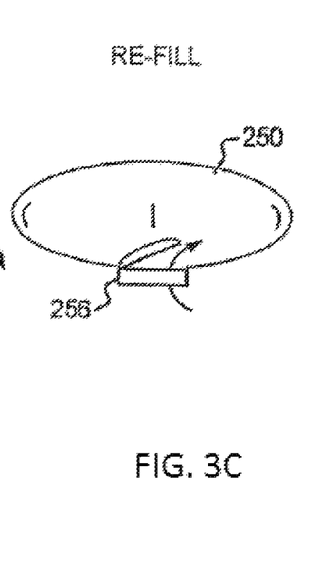
Figure 3D:
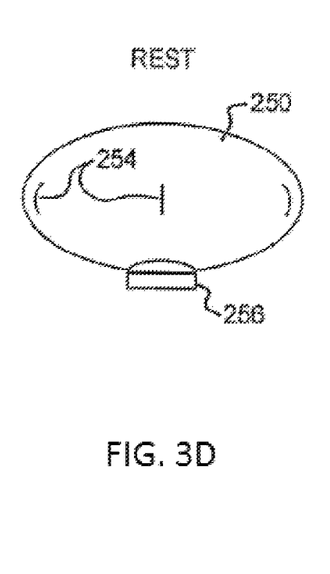

FIG. 2 shows a cross-section of another embodiment of a rate-sensitive compressible member 150 that is generally rectangular in shape (i.e., a strip). The member 150 has a top surface 160, a bottom surface 164, sidewalls 168-1, 168-2 (generally, 168), and a hollow inner chamber 172. Each sidewall 168 has a respective small opening 176-1, 176-2 (generally, 176) formed therein. (Practice of the invention can be achieved with only one of the sidewalls 168 having an opening). When the member 150 compresses generally in the direction indicated by arrow 180, airflows 184 exit the small openings 176. This embodiment illustrates that a variety of shapes, for example, disc-shaped, cylindrical, and pyramidal, and the like, can be used to implement rate-sensitive compressible members of the invention capable of absorbing impact energy.

FIGS. 3A-3D diagrammatically illustrate another version of a compressible member 250 embodied in accordance with the invention. The compressible member 250 differs from the prior two embodiments in that it includes separate orifices for the inflow and outflow, respectively, of air relative to its inner chamber. More specifically, the compressible member 250 includes a plurality of outflow orifices, in the form of thin slits 254 in the wall of its enclosure 252, spaced about the circumference of the enclosure 252. The compressible member 250 also includes an inflow orifice, which includes a one-way flap valve 256, located at the bottom of the enclosure 252.

As the sequence of FIGS. 3A-3D illustrates, moving from left to right in the figure, upon impact, the one way flap valve 256 is forced closed and air is forced out of the inner chamber of the compressible member 250 through the thin slits 254. Upon removal of the force, the one-way flap valve 256 opens and air returns quickly to the inner chamber of the compressible member 250 through the opening of the valve.

To further enhance the "rate-sensitive" response of the compressible member 250 of this embodiment, the outflow slits 254 are elastic, being formed directly in the TPE material of the wall of the enclosure 252. Because of this elasticity, the slits 254 provide some resistance to opening and to the escape of the air in the inner chamber during the impact, and close resiliently and quickly following the impact. The slits 254 are also preferably significantly smaller in diameter that the inflow opening of the one-way flap valve 256. As a result, the member 250 provides a greater degree of resistance to compression and collapse depending upon the energy level of the impact force, yet will return quickly to its uncompressed condition upon removal of the force, ready to absorb additional impacts.

Figure 4A:
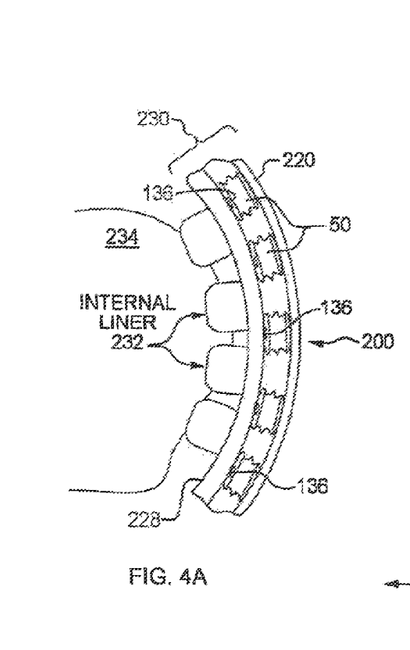
FIG. 4A is a partial, cross-sectional view of an embodiment of a multilayer shell structure, which includes a layer formed of a plurality of compressible members embodied in accordance with the invention, configured to function as a protective helmet for a wearer's head.

FIG. 4A is a partial cross-sectional view of an embodiment of a multilayer shell structure 230 which includes a plurality of the rate-sensitive compressible members 50 (FIG. 1A) disposed therein, configured as a protective helmet 200. In this particular embodiment shown, the compressible members 50 are spaced from one another and sandwiched between an outer layer 220 and an inner layer 228. An internal foam liner 232 of conventional design may be disposed between the inner layer 228 and the wearer's head.

In the shell structure 230 of FIG. 4A, the orifice 136 of each rate-sensitive compressible member 50 preferably aligns with an opening (not shown) in the surface of the inner layer 228 and through any internal liner 232 so that expelled or inhaled air can pass into the interior of the shell structure 230. Similarly, such openings 136 can be on the sides of the compressible members 50, allowing the release and return of air through the interstitial region of the shell structure 230 between the outer and inner layers 220 and 228.

Those desiring further details of the construction of a shell structure such as shell structure 230, and its configuration as a protective helmet, are referred to my copending U.S. patent application Ser. No. 11/059,427, filed Feb. 16, 2005, and my related application filed concurrently herewith, titled "Energy Absorbing Inner Liners For Use With Protective Headgear", which, as noted above, are incorporated by reference herein.

Those skilled in the art will appreciate that other embodiments of the compressible member, such as the members 150 and 250 shown above, can be substituted for the compressible members 50 in the shell structure 230 of FIG. 4A, and that two or more types or sizes of compressible members can be combined therein. Those skilled in the art will also appreciate that modifications can be made to the shell structure 230 without departing from the scope of the invention. For example, the compressible members 50 may be secured to a single layer, either on their inside or outside, instead of being sandwiched between two layers as shown in FIG. 4A. Additionally, the compressible members 50, instead of being separate from one another, could be interconnected by a thin web of TPE material to form a sheet-like middle layer. The connecting web material could also include internal passageways that communicate with the inner chambers of adjacent ones of the compressible members 50, so that, during an impact, air passes from one chamber or member 50 to another, in addition to venting from the chambers, spreading the impact force among several members 50.

Figure 4B:
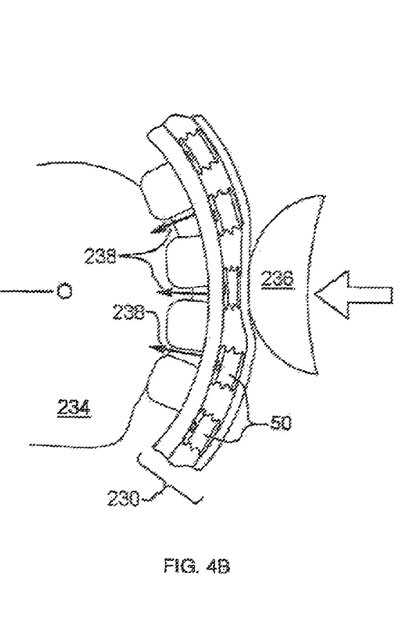
FIG. 4B is a diagram illustrating the operation of protective shell of FIG. 4A during a direct impact.

FIG. 4B illustrates an exemplary simulated operation of the shell structure 230, with rate-sensitive compressible members 50, undergoing a direct impact from an object 236. In this example, the shell structure 230 operates to reduce linear-acceleration of the wearer's head 234. When the object 236 strikes the outer layer, the members 50 directly beneath the outer layer 220 at the point of impact compress. The compression of the shell structure 230 also causes air to exit the members 50 (arrows 238) and enter the interior of the shell structure 230 through the openings in the members 50 and in the inner layer 228.

Figure 4C:
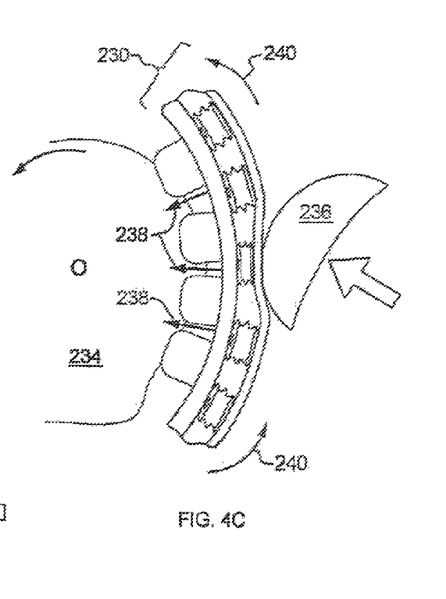
FIG. 4C is a diagram illustrating the operation of protective shell of FIG. 4A during a tangential impact.

FIG. 4C illustrates an exemplary simulated operation of the shell structure 230, with rate-sensitive compressible members 50, undergoing a tangential impact from an object 236. In this example, the shell structure 230 operates to reduce rotational acceleration of the wearer's head 234. When struck by an object tangentially, the outer layer 220 shears with respect to the inner layer 228 in a direction of motion of the object, as illustrated by arrows 240. Members 50 at the point of impact compress to some extent and shear with the outer layer 220. As with the example of FIG. 4B, the compression causes air to exit the members 50 and to enter the interior of the headgear. The combined effects of the shearing motion of the outer layer 220 and members 50, the rate-sensitive and energy-absorbing compression of the members 50, and the release of air into the interior of the headgear operate to reduce the rotational forces reaching the wearer's head 234.

The layered construction of the invention can be likewise used to construct a variety of types of protective headgear including, but not limited to, safety helmets, motorcycle helmets, bicycle helmets, ski helmets, lacrosse helmets, hockey helmets, and football helmets, batting helmets for baseball and softball, headgear for rock and mountain climbers, and headgear for boxers. Other applications can include helmets used on construction sites, in defense and military applications, and for underground activities.

Although the foregoing description focuses primarily on protective headgear, it is to be understood that the compressible members of the invention can be used in other types of equipment used for sports activities or other applications.

Figure 5:
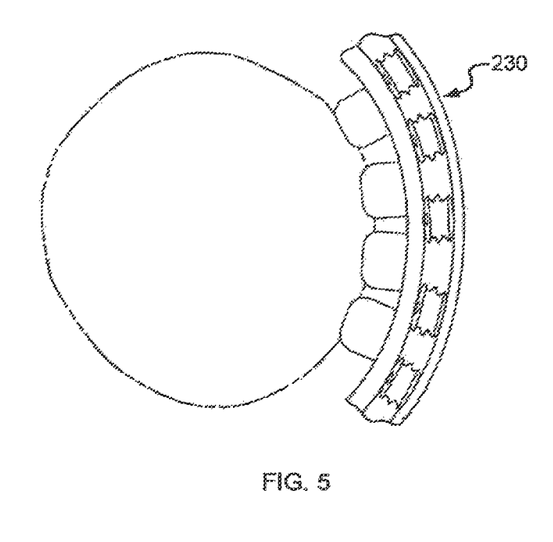
FIG. 5 is a partial, cross-sectional view of an embodiment of a multilayered shell structure, similar to that of FIG. 4A, configured for use as a protective body pad, e.g., a shin pad.

By way of example, FIG. 5 illustrates the shell structure 230 configured as a shin pad which may be removably fastened by any suitable means e.g., elastic straps, to the lower leg of a wearer. Those skilled in the art will appreciate that the shell structure 230 may be similarly configured as a face mask, elbow pad, shoulder pads, chest protector or the like, or as a protective body pad for other sports/activities such as "extreme" and other outdoor sports, motorcross, car racing, and the like.

Figure 6A:
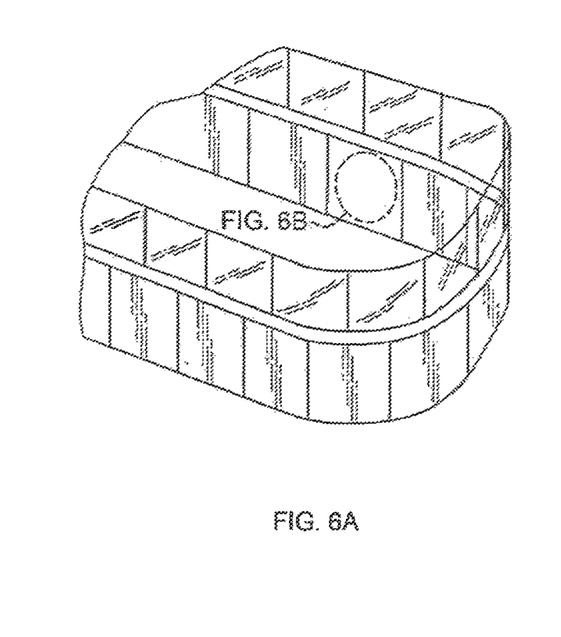
FIGS. 6A and 6B are diagrams illustrating an embodiment of a multilayer shell structure, similar to that of FIGS. 4A and 5, configured for use as an energy-absorbing covering for the boards of a hockey rink.
Figure 6B:
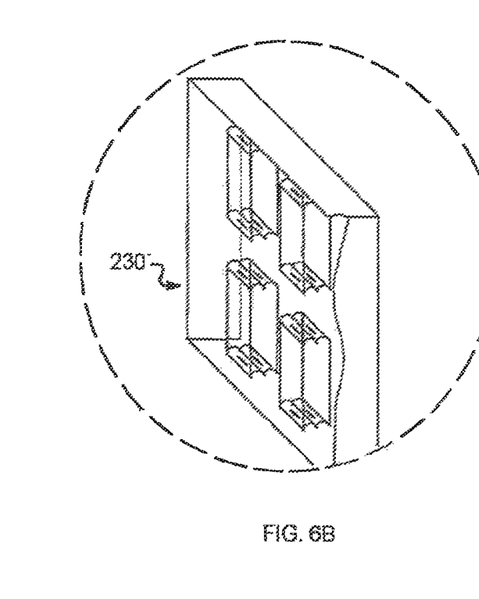

FIGS. 6A and 6B illustrate a shell structure 230', similar to, but fabricated in larger scale and dimension than, the shell structure 230 previously described, as an impact absorbing covering for application to the boards of a hockey rink. A similar shell structure 230' could be used as an impact-absorbing covering for basketball gymnasium walls, racket ball walls, indoor soccer or football arenas, and other structures which enclose an athletic event.

Figure 7:
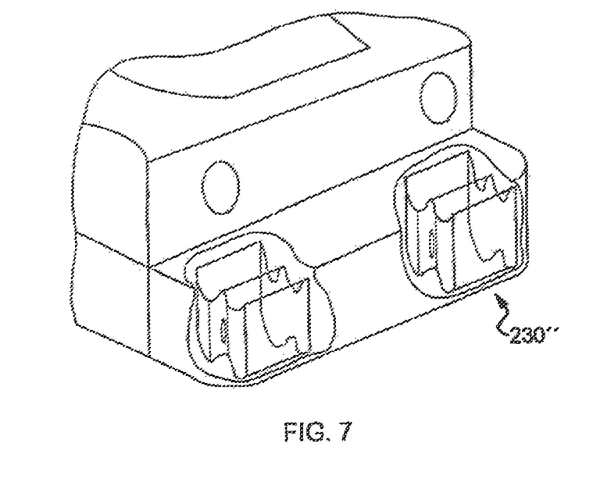
FIG. 7 is a diagram illustrating an embodiment of a multilayered shell structure, similar to those of FIGS. 4A, 5 and 6, configured for use as an impact-absorbing bumper on a motor vehicle.
Figure 8:
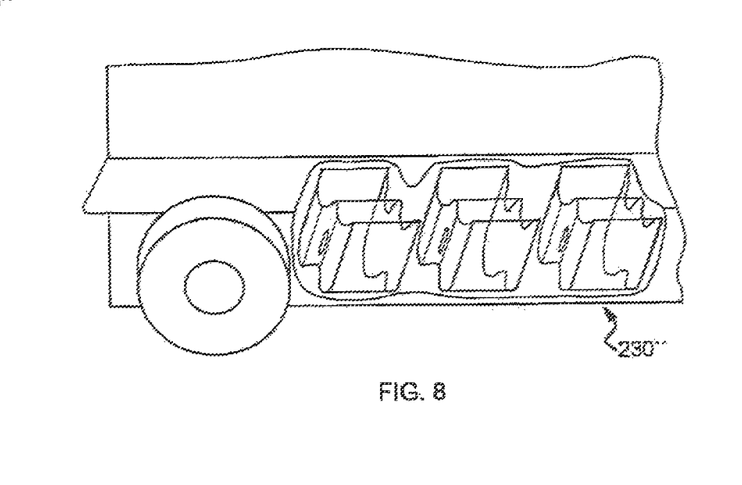
FIG. 8 is a diagram illustrating an embodiment of a multilayered shell structure, similar to those of FIGS. 4A through 7, configured for use as an energy-absorbing dashboard in a vehicle.

FIGS. 7 and 8 illustrate still another version of a shell structure 230", similar to but larger than the shell structure 230 previously described, configured as part of a vehicle bumper and dashboard, respectively. Other similar applications of the shell structure 230" include vehicle decking, highway barriers and the like.

While the invention has been shown and described with reference to specific preferred embodiments, it should be understood by those skilled in the art that various changes in form and detail may be made therein without departing from the spirit and scope of the invention as defined by the following claims.

What is claimed is:

1. An energy-absorbing shell structure comprising:
 a plurality of energy-absorbing compressible members arranged side-by-side and interconnected by a thin web of material to form a connecting layer, each compressible member comprising:
  i) a compressible enclosure having a wall defining a hollow inner chamber;
  ii) a volume of fluid at least partially filling said inner chamber; and
  iii) at least one orifice in the enclosure wall configured to vent fluid from the inner chamber to an interior of the shell structure;

each orifice being configured to provide a first resistance to compression when the member is subjected to a relatively high energy impact and a second, lower resistance to compression when the member is subjected to a lesser energy impact, wherein each orifice is initially closed and opens when the member is impacted.

2. The shell structure of claim 1, wherein the thin web is made of a thermoplastic elastomer material.

3. The shell structure of claim 1, further comprising an outer shell layer secured to the connecting layer of interconnected energy-absorbing compressible member.

4. The shell structure of claim 1, wherein the connecting layer of interconnected energy-absorbing compressible member is disposed between an outer layer and an inner layer.

5. The shell structure of claim 4, wherein the outer layer is capable of rotating or shearing relative to the inner layer.

6. The shell structure of claim 1, further comprising an inflow opening configured to allow fluid to flow into the inner chamber and configured to prevent air from flowing out of the inner chamber through the inflow opening.

7. The shell structure of claim 6, further comprising a flap valve coupled to the inflow opening.

8. The shell structure of claim 6, wherein the inflow opening is larger than each orifice.

9. The shell structure of claim 8, wherein the compressible enclosure is configured to return to an uncompressed configuration faster than the compressible enclosure compresses.

10. The shell structure of claim 1, wherein the at least one orifice has a first diameter when the shell structure is subject to the relatively high energy impact and a second, smaller diameter when the shell structure is subject to the lesser energy impact.

11. The shell structure of claim 1, wherein the at least one orifice is configured to vent the fluid from the inner chamber at a first rate when the member is subjected to the relatively high energy impact and is configured to vent the fluid from the inner chamber at a second, slower rate when the member is subjected to the lesser energy impact.

12. The shell structure of claim 1, wherein the compressible enclosure is compressible by up to ninety percent of its uncompressed volume.

13. The shell structure of claim 1, wherein the shell structure includes an inner layer configured to be positioned adjacent a user's head with an opening in the inner layer, wherein the at least one orifice is configured to be aligned with the opening in the inner layer such that the fluid is vented from the inner chamber through the opening in the inner layer to the user's head.

14. The shell structure of claim 1, wherein the size of each orifice increases as the energy of the impact increases.

15. The shell structure of claim 1, wherein each orifice comprises a vertical slit.

16. The shell structure of claim 1, wherein the plurality of compressible members comprise a material having a glass transition temperature of less than negative twenty degrees Fahrenheit.

* * * * *